L. B. Fisher,
Sawing Stone.
N° 13,784. Patented Nov. 13, 1855.

Witnesses
Hiram Shoudley
N. I. Skeels

Inventor
Luther B. Fisher

UNITED STATES PATENT OFFICE.

LUTHER B. FISHER, OF COLDWATER, MICHIGAN.

MARBLE-SAWING MACHINE.

Specification of Letters Patent No. 13,784, dated November 13, 1855.

*To all whom it may concern.*

Be it known that I, LUTHER B. FISHER, of Coldwater, in the county of Branch and State of Michigan, have invented a new and Improved Mode of Constructing Machinery for the Purpose of Sawing Stone to any Desired Bevel for Monumental Purposes; and I do hereby declare that the following is a full and exact description thereof, reference being had to the accompanying drawings and to the letters of reference marked thereon.

Figure 1:
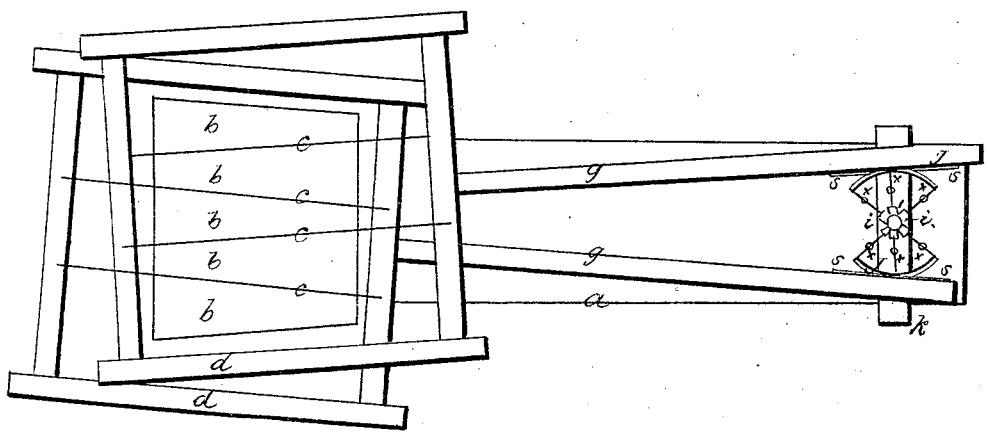
Figure 2:
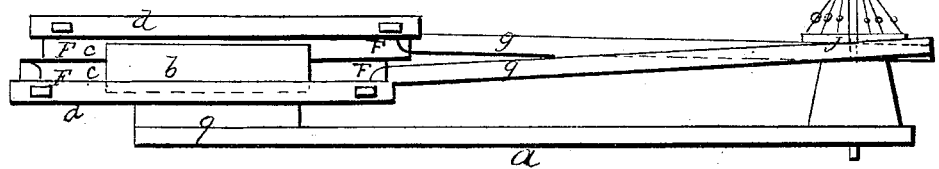

Figure 1 is a top view of my improvement in machinery for sawing stone or marble for monumental purposes. Fig. 2 is a side view of the same.

Similar characters of reference in the several figures denote the same part of the apparatus.

The object of my improvement is to facilitate the sawing of stone to any desired bevel and use two or more saws at one time. This desirable object has long been sought but the difficulty of running several saws on different parallels has hitherto been the great objection. I design to furnish an adjustment which will overcome this objection.

The nature of my invention consists in adjusting the saw frames to any desired bevel by means of the expanding and contracting segments which will be hereafter explained.

In the drawing (*a*) is the foundation on which the machine rests. (*b, b, b, b*) are five monuments being sawed at one process; (*q*) a block to elevate the stone; (*d, d*) frames made in the usual form to hang the strips of iron commonly called saws marked (*c c*) may be strained with nuts and screws or otherwise; (F F F F) pieces of metal attached to the ends of frames (*d, d*) to hang the saws (*c, c*) to; (*g, g*) connections to transmit motion to frames (*d, d*); (*h*) perpendicular rockshaft may be hung on suitable bearings at each end or otherwise; (J, J) adjustable spring segments may be formed of any thin metal and notched, down on arm (*k*). On the inside surface of these segments are lugs (*t, t, t*); (*i, i, i*) lugs on hub (*n*); (*o, o, o*) braces connected at one end with lugs (*t, t, t*) and at the other with lugs (*i, i, i*) on hub (*n*); (*k*) an arm secured to rock shaft (*h*); (*r*) a key or may be a set screw to secure hub (*n*) to shaft (*h*), there may be another hub (*n*) attached to shaft (*h*) on the underside of arm (*k*), said hub being connected to segments (J, J,) by braces (*o, o, o*), similar to those on the upper side. It will be seen that by crowding down hub (*n*) braces (*o, o, o*) will crowd out segments (J, J) and enlarge the circle, thus widening the space between connection (*g, g*) which will admit of sawing larger stone, or increase the bevel as may be desired, by the upward motion of said hub the effect will be to diminish the size of stone or bevel. Reciprocating motion may be had by connecting to arm (*k*) which will give motion to connections (*g, g*) by means of chains or straps (*s, s, s, s*) which are secured to each end of segments (J, J) and crossed and secured to connections (*g, g*).

What I claim as my invention, and desire to secure by Letters Patent, is—

Operating the frames of stone sawing machines by means of the segments (J J) in combination with braces (*o, o, o*), hub (*n*), arm (*k*), and chains or straps (*s, s, s, s*), for the purpose and in the manner set forth.

LUTHER B. FISHER.

Witnesses:
  HIRAM SHONDLER,
  N. D. SKEELS.